United States Patent Office 3,288,705
Patented Nov. 29, 1966

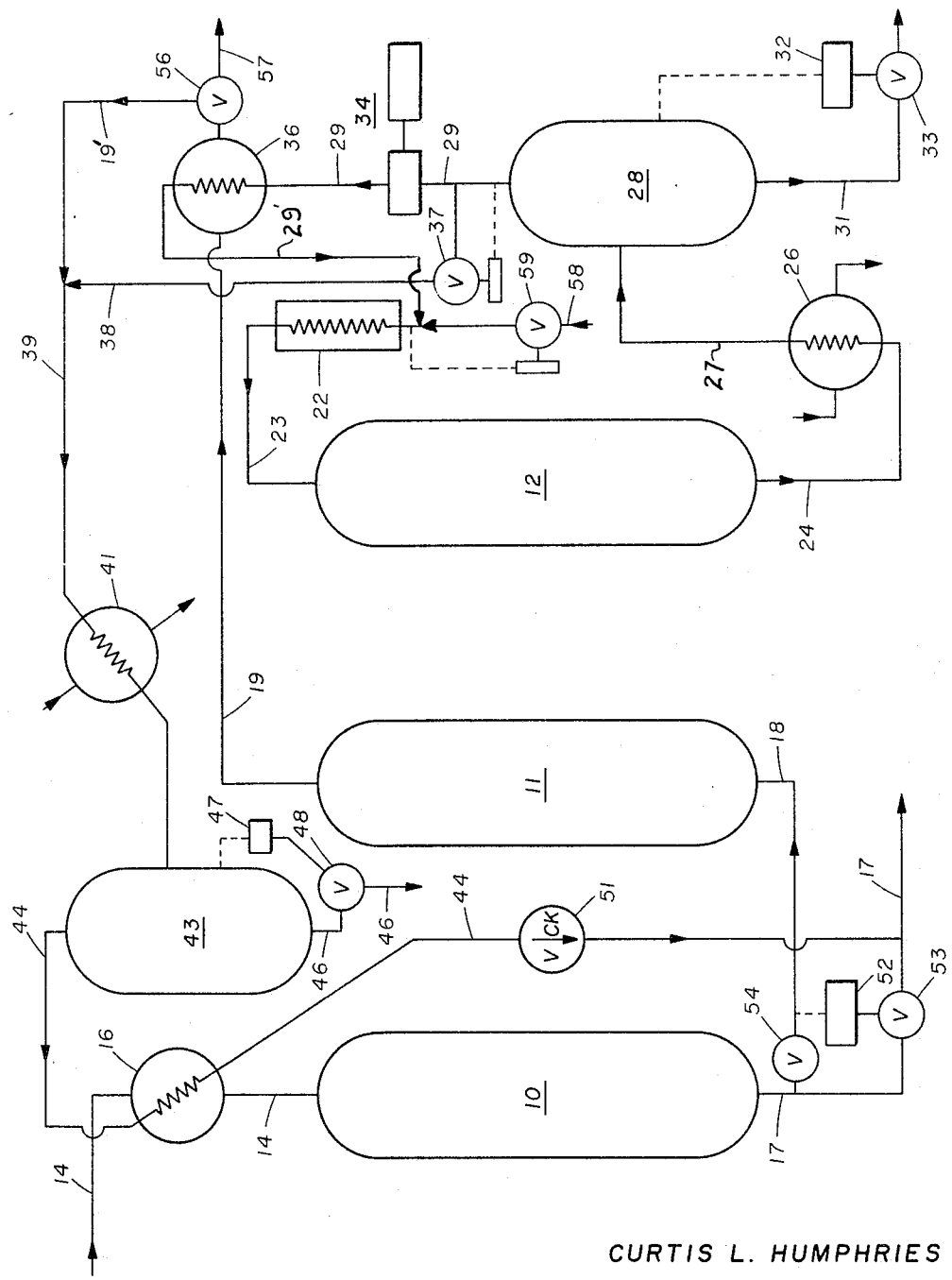

3,288,705
HYDROCARBON ADSORPTION SYSTEM
Curtis L. Humphries, Dallas, Tex., assignor to Mobil Oil Corporation, a corporation of New York
Filed Oct. 23, 1963, Ser. No. 318,229
10 Claims. (Cl. 208—310)

This invention relates to systems employing solid adsorbents for processing natural gas to recover hydrocarbons.

The solid adsorbent hydrocarbon recovery unit has become an important tool for the economical recovery of hydrocarbon liquids from natural gas streams. The solid adsorbent hydrocarbon recovery unit arranged for continuous operation may include either the open-cycle or the closed-cycle regeneration system and employ several adsorption towers, each containing a bed of solid adsorbent. The present invention is more specifically concerned with units embodying the closed-cycle regeneration system in conjunction with at least three towers. However, it applies equally to all units having a plurality of towers.

The units of this type, having for example three towers, are arranged to operate with the towers performing adsorbing, cooling, and regenerating functions. Generally, automatic switching on a given cycling of the towers from one function to another is utilized. The cycling occurs usually at a uniform time interval. Thus, the tower adsorbing is switched to regenerating, the tower cooling is switched to adsorbing, and the tower regenerating is switched to cooling. Inasmuch as the cyclic switching in tower function is automatic and, for practical purposes, instantaneous, the fluid flows through the solid adsorbent hydrocarbon unit are without any significant interruption.

The closed-cycle regeneration system in these units is known to be more efficient in condensing the hydrocarbons desorbed from the adsorbing tower which is now subjected to a regenerating function. The reason for this is that the condensation efficiencies, with respect to the desorbed components, of the regeneration gas stream used to regenerate such former adsorption tower are proportional to the content of the heavier components in the regeneration gas. Preferably, the regeneration gas has such content of heavier components that its dew point is near to the tower temperature. Thus, the amount of desorbed components from this former adsorbing tower which are required to saturate the gas to the dew point is reduced. A regeneration gas having substantially these qualities may be denoted as being "rich."

A problem is created in the closed-cycle regeneration system by such use of rich regeneration gas for regenerating the former adsorbing tower. It will be apparent that the inventory of the rich regeneration gas stream fluctuates during tower regenerating. For example, the inventory of the rich regeneration gas will decrease at the latter part of the regenerating function, i.e., the terminal introduction of the hot and rich regeneration gas into the tower being regenerated. In order to preserve a relatively constant set of operating conditions within the closed-cycle regeneration system, additional gas must be introduced into the regeneration system to maintain the inventory therein relatively constant. One means to remedy a deficit in the inventory has been through the addition of a gas, such as natural gas or the lean gas effluent from the adsorbing tower, into the regeneration system. A surplus to the inventory of the regeneration gas occurs immediately after subjecting a tower to regeneration when the rich regeneration gas heats the regenerating tower to a temperature sufficient to initiate desorption of heavier hydrocarbons from the solid adsorbent. A portion of the rich regeneration gas must be removed from the regeneration system under these conditions to maintain a relatively constant inventory of regeneration gas. In the past, the surplus regeneration gas usually has been combined with either the natural gas introduced into the adsorbing tower or its lean gas effluent. In the first instance, the feed balance to the adsorbing tower is adversely affected by introducing a quantity of condensable hydrocarbons much in excess of that contained in an equivalent volume of the natural gas. In the second instance, a large volume of hydrocarbon liquids is lost into the effluent lean gas. Thus, several problems are present in known conventional units having several towers when employing the closed-cycle regeneration system which relate directly to maintaining constant the inventory of the rich regeneration gas.

It is well known in the closed-cycle regeneration system used, as priorly described, with several towers to use a lean gas, such as the adsorbing tower effluent gas, for cooling a priorly regenerated tower to operating temperatures. Because of the switching of the towers from the regenerating to the cooling functions, undesired losses of the hydrocarbon liquids into the lean gas from the residue rich regeneration gas in the regenerated tower occur. Generally at present, the residue rich regeneration gas in the cooling tower, and any hydrocarbon components still being desorbed, is vented to either the adsorbing tower effluent lean gas so that no recovery of the condensable liquid hydrocarbon is made or into the natural gas being introduced into the adsorbing tower. The latter event unbalances the natural gas feed to the adsorbing tower by introducing a relatively large quantity of condensable hydrocarbon liquids at elevated temperatures. Thus, at present there is also a problem relating to the venting of the residue rich regeneration gas left in a priorly regenerated tower when such tower is switched to cooling with a lean gas. Obviously, the most efficient solid adsorbent hydrocarbon recovery unit should utilize a rich regeneration gas during regenerating of a tower and a lean gas during the cooling of a tower.

It is an object of the present invention to provide a system of the type described for processing natural gas to improve the recovery of hydrocarbon liquids. Another object is to provide for the recovery of hydrocarbon liquids from the surplus rich regeneration gas in the closed-cycle regeneration system in units as heretofore described. Yet another object is to remedy a deficiency in the inventory of rich regeneration gas in the closed-cycle regeneration system. A further object is to recover the hydrocarbon liquids in the residue rich regeneration gas remaining in a tower when it is switched to cooling with a lean gas. Another further object is to satisfy the preceding objects without the addition of excess hydrocarbon liquids to the natural gas introduced into the adsorbing tower or by unbalancing any other stream in the solid adsorbent hydrocarbon recovery unit. Yet another object is to provide a system as described not subject to the priorly described problems but in which is employed a rich regeneration gas in the regenerating function and a lean gas in the cooling function.

The objects of the present invention are attained in a solid adsorbent hydrocarbon recovery unit having a plurality of towers adapted for performing adsorbing, cooling, and regenerating functions and embodying tower regeneration by circulating a closed-cycle rich regeneration gas in a novel system hereinafter described. More particularly, the present system in such unit provides for using a regeneration gas of substantially uniform richness in hydrocarbons in a closed-cycle regeneration system maintained at a relatively constant inventory of regeneration gas; cooling a tower with a gas lean in hydrocarbon liquids without loss of the hydrocarbon liquids in the residue of rich regeneration gas remaining in the tower when subjected to a cooling function; recovering hydrocarbon liquids in the surplus rich regeneration gas during a regenerating function; and, if desired, using the sensible heats of the various streams to further improve the recovery of hyrdrocarbon liquids from natural gas.

In the drawing, there is shown a diagrammatic flow diagram of a solid adsorbent hydrocarbon recovery unit adapted to recover hydrocarbon liquids from natural gas by the apparatus and procedures of the present invention.

Referring now to the drawing, a description of a preferred and illustrative embodiment of the present invention will be given. There is shown a solid adsorbent hydrocarbon recovery unit having towers 10, 11, and 12. These towers are interconnected by the usual conduits and valves cylically controlled by an automatic switching means of any conventional design whereby the towers 10, 11, and 12 alternately will perform adsorbing, cooling, and regenerating functions. However, in the interest of preventing the present description from being complex and prolix, such automatic switching means are present but not shown in detail through a complete cycle of functions. More particularly, the mentioned recovery unit is at a condition of tower functions where the tower 10 is adsorbing, the tower 11 is cooling, and the tower 12 is regenerating.

The towers 10, 11, and 12 may be of any suitable construction and are shown to be cylindrical members with their longitudinal axes vertically positioned. Each of the towers 10, 11, and 12 contains a bed of suitable solid adsorbent which is adapted to separate the condensable hydrocarbon liquids, such as propane, butane, and like heavier materials, from the lighter hydrocarbons, such as methane, in natural gas. Examples of usable solid adsorbents are silica gel, activated charcoal, and the solid desiccants such as the desiccant identified by "Mobil Sorbead H," a registered trademark of Socony Mobil Oil Company, Inc.

Natural gas, from any suitable pressurized source to provide operating pressures and fluid flows, provides a main gas stream which is passed via a conduit 14 through a heat exchanger 16 to be cooled prior to flowing into the tower 10. The condensable hydrocarbon liquids are removed in the tower 10 by the solid adsorbent contained therein. The lean or stripped main gas stream effluent is removed from the tower 10 via the conduit 17 and may be sold or transmitted to a suitable utilization. A portion of the stripped main gas stream is used for cooling the tower 11 which is in a heated condition as a result of prior regeneration. The use of such a lean gas stream for cooling is of great advantage in that the solid adsorbent in the tower 11 is not excessively presaturated with the condensable hydrocarbon liquids, such as propane and butane, before being subjected to an adsorbing function. The prior regeneration of the tower 11 with a rich regeneration gas leaves as a residue in the solid adsorbent some rich regeneration gas containing a quantity of condensable hydrocarbon liquids and some hydrocarbon liquids still being desorbed. The exact quantity of hydrocarbon liquids depends upon several conditions including the equilibrium conditions within the tower 11 at the conclusion of regeneration. A considerable quantity of such condensable hydrocarbon liquids can be carried in the towers when each is switched from the regenerating to the cooling function.

A portion of the stripped main gas stream from the tower 10 is applied via the conduit 18 through the tower 11 for cooling purposes. The tower 11 is cooled to suitable adsorbing temperatures, for example, less than 350° F. The condensable hydrocarbon liquids in the tower 11 are swept out of the solid adsorbent therein and exit, as an effluent gas stream, the tower 11 through the conduit 19. The condensable hydrocarbon liquids contained in the heated tower 11, when it is switched to a cooling function, are generally removed in the first portions of the effluent gas stream carried in the conduit 19. For example, these hydrocarbon liquids may be removed in the first two minutes of effluent gas stream flow. The first portions of the effluent gas stream in the conduit 19 are not only rich in condensable hydrocarbons, but also are at their relatively highest temperatures. The system of the present invention subjects the heated effluent gas stream in the conduit 19 to several advantageous uses which will be discussed more fully hereinafter.

Turning now to the closed-cycle regeneration system, the tower 12, priorly saturated with condensable hydrocarbon liquids while on an adsorbing function, is now switched to a regenerating function. In the closed cycle, a heated rich regeneration gas is circulated through the tower 12 to desorb the condensed hydrocarbon liquids. The rich regeneration gas is heated to a suitable regeneration temperature, for example about 500° F., in a conventional heater 22. The heated rich regeneration gas, via the conduit 23, is passed into the tower 12. Only a slight decrease in regeneration gas inventory, if any, occurs at this time and is beneficial. The rich regeneration gas after only a short interval of time, for example two minutes, will traverse the tower 12. It will begin to and ultimately will heat same to a regeneration temperature, as exemplified by a suitable temperature of the rich regeneration gas effluent emerging from the tower 12 via a conduit 24. This heating results to produce a surplus of such rich regeneration gas in the closed-cycle regeneration system caused by the quantity of hydrocarbon gases and liquids desorbed from the tower 12. The effluent rich regeneration gas is then passed through a cooler 26, which may be an atmospheric heat exchanger, and via a conduit 27 flows to a high pressure separator 28. The high pressure separator 28 is adapted to provide an overhead stream via a conduit 29 of cooled rich regeneration gas stripped of most of the desorbed hydrocarbon liquids from the tower 12. Also, the high pressure separator 28 is adapted to provide a main hydrocarbon liquids fraction effluent via a conduit 31 which may be sent to liquids storage, or to other suitable utilization. Generally, a liquid level controller 32 may be utilized to maintain the liquid in the high pressure separator 28 at a suitable level. The controller 32 may be operative in controlling a motor valve 33 contained in the conduit 31 for this result. By this means, a desired portion of condensable hydrocarbon liquids is recovered from the effluent rich regeneration gas exiting the tower 12 via the conduit 24. Preferably, the composition of the rich regeneration gas in the conduit 29 is such that it is at its dew point when subjected to a temperature equal to the temperature of the cooler 26. A suitable blower 34 is provided in the conduit 29 to provide for the desired circulation of the rich regeneration gas in the closed-cycle regeneration system priorly described.

Preferably, the rich regeneration gas in conduit 29 is passed in indirect heat-exchanging relationship with the heated lean gas stream effluent from the tower 11 transmitted in the conduit 19. A heat exchanger 36 disposed in the conduits 19 and 29 may be used for this purpose. By this means, the rich regeneration gas in the conduit 29 is warmed prior to being introduced into the heater 22 via a conduit 29' by the relatively heated lean gas stream effluent from the tower 11 in the conduit 19. Obviously, this heat-exchanging relationship, especially at the beginning of the regenerating function, reduces the magnitude of heat added to the regeneration gas by the heater 22 in the closed-cycle regeneration system that has been described.

As previously indicated, it is most desirable to maintain the inventory of the regeneration gas at a relatively constant value. For this purpose, a back pressure controlling means is utilized in a vent conduit 38 connected to the conduit 29. Preferably, this means is connected on the upstream side of the heat exchanger 36. Any suitable means may be used such as a back pressure actuated motor valve 37 which permits flow from, but not into, the conduit 29. The motor valve 37 is arranged in a conventional manner with means to sense the pressure of the rich regeneration gas in the conduit 29 and respond to a given pressure change from normal operating pressure to vent any surplus gas above a given inventory from the conduit 29. Thus, a relatively constant inventory is maintained during conditions creating a surplus of the rich regeneration gas.

The desired static control of the inventory of the rich regeneration gas may also be combined with the prevention of loss of the condensable hydrocarbon liquids in the first portions of the heated effluent gas stream in the conduit 19 from the tower 11 by the following portion of the system of this invention. More particularly, the heated effluent gas stream in the conduit 19 from the tower 11 is transmitted by a conduit 19' to the vent conduit 38 of the closed-cycle regeneration system through a three-way valve 56. The combined flows in the conduits 19' and 38 are passed into a conduit 39. The valve 56 is arranged to admit at least the first portion of the effluent gas stream through the conduit 19' into the conduit 39. For example, the first portion of this stream may be admitted into the conduit 39 only during the first two minutes of effluent gas flow. Thereafter, all the effluent gas stream in the conduit 19 may be sent through a conduit 57 to a suitable utilization for lean gas. The flow in the conduit 57 may, of course, be combined by a conduit (not shown) with the lean gas flow in the conduit 17. This arrangement provides for a combination of surplus rich regeneration gas with the heated effluent gas stream from the tower 11 containing residue hydrocarbon liquids in the conduit 39.

The combined gas stream in the conduit 39 is separated into a condensable hydrocarbon liquids fraction and an effluent gas stream. Preferably, this separation is under conditions such that this liquids fraction resembles the main hydrocarbon liquids fraction. These two hydrocarbon liquids fractions, if desired, may be combined by a conduit (not shown) for their recovery and utilization. Furthermore, the combined gas stream in the conduit 39 is separated under conditions such that the effluent gas stream is substantially similar to the stripped main gas stream in the conduit 17. The gas streams may, if desired, be combined by a conduit (not shown). Any suitable means to obtain such separation may be used. For example, such means may include a refrigeration-cooled heat exchanger 41 of suitable design that is adapted to cool the combined gas stream in the conduit 39 to a temperature adequate to permit a high pressure separator 43 of conventional design to provide the desired effluent gas stream in an effluent conduit 44 and the desired condensed hydrocarbon liquids fraction in a second effluent conduit 46. A liquid level may be maintained in the high pressure separator 43 by any suitable means. For example, a liquid level controller 47 may be connected with the separator 43 and adapted for operating a motor valve 48 in accordance with conventional practices to control the liquid flow through the conduit 46. Thus, no condensable hydrocarbon liquids in the surplus rich regeneration gas or in the effluent gas from the tower 11 are lost. Further, the combined gas stream in the vent conduit 39 is maintained relatively constant in its condensable hydrocarbon liquids content by combining the flows in the conduits 19' and 38. The reason for these results, as previously described, is that the effluent gas stream from the tower 11 and the surplus rich regeneration gas in the conduit 29 are about inversely proportionate at any time in their content of condensable hydrocarbons and also with regard to their heat quantum.

The gas stream from the separator 43 in the conduit 44 is sent in indirect heat-exchanging relationship with the main gas stream in the conduit 14 that is to be applied to the tower 10. This may be accomplished by using the priorly mentioned heat exchanger 16. Thus, the relatively cold gas stream in the conduit 44 is indirectly warmed while the incoming main natural gas stream in the conduit 14 is indirectly cooled. This is of advantage since the colder the main gas stream passing into the tower 10, the greater the quantity of hydrocarbon liquids absorbed by the solid adsorbent contained in the tower 10.

The usual flow control means to provide suitable operating conditions in the system of this invention may be used. The pressure of the main gas stream provides for most of the operating energy in the unit. For example, a check valve 51 may be provided in the conduit 44 to prevent the stripped main gas stream in the conduit 17 from being inadvertently introduced into the high pressure separator 43. Similarly, a flow control means 54 may be employed in the interconnection of conduit 17 with the conduit 18 to provide a desired portion of the stripped main gas stream to be introduced at a suitable pressure into the tower 11 for cooling purposes and thereafter through the remainder of this system. This may be provided in any manner such as by including a flow controller 52 connected with the conduit 18 downstream of the flow control means 54 and adapted to operate a motor valve 53 in the conduit 17 whereby the desired portion of the stripped main gas stream in conduit 17 is diverted at a suitable pressure for cooling the tower 11 and passing through the cooler 41 and the separator 43.

By the described system it will be apparent that many advantages are provided. For example, the condensable hydrocarbon liquids in the surplus to the inventory of the regeneration gas, as the solid adsorbent in the tower 12 reaches regenerating temperatures, are recovered in the separator 43. Similarly, any condensable hydrocarbon liquids carried by the effluent gas stream through the valve 56 from the tower 11 into the conduit 19' will be likewise recovered in the high pressure separator 43.

Any deficit in the inventory of the rich regeneration gas in the last part of the regenerating function may be made up from the natural gas stream in the conduit 14. This result may be obtained by passing natural gas from the conduit 14 through a conduit (not shown) into a conduit 58 connected to the conduit 29'. A flow control valve 59 is used in the conduit 58 and adjusted so that natural gas is introduced therethrough only when a significant deficit to a given inventory of rich regeneration gas occurs during the last part of the regeneration of the tower 12.

From the foregoing it will be apparent that the system of this invention satisfies all of the stated objects. Various changes and alterations to the described system may be made by those skilled in the art without departing from the scope of this invention. It is intended that such changes and alterations be encompassed within the appended claims and that such claims set forth the only limitations of this invention inasmuch as the foregoing description is to be taken as a means of illustration.

What is claimed is:

1. The process of recovering hydrocarbon liquids from a natural gas stream in a solid adsorbent hydrocarbon recovery unit using a plurality of beds of adsorbent performing adsorbing, cooling, and regenerating functions with closed-cycle regeneration, comprising the steps of:
   (a) flowing the natural gas stream through a first adsorbent bed to remove adsorbable hydrocarbons and then discharging the stripped main gas stream from such bed,
   (b) flowing a portion of the stripped main gas stream from the first bed through a previously regenerated second adsorbent bed for cooling the second adsorbent bed to suitable adsorbing temperatures and then discharging this portion of the stripped main gas stream,
   (c) circulating a heated rich regeneration gas through a closed-cycle regeneration system including a third adsorbent bed, and separating the hydrocarbons desorbed from such bed which are carried in the regeneration gas into a rich regeneration gas and a hydrocarbon liquids fraction,
   (d) combining at least the first portion of the stripped main gas stream discharged after cooling the second adsorbent bed with surplus rich regeneration gas from the closed-cycle regeneration system, (e) separating the combined gas stream into a second stripped gas stream and a second hydrocarbon liquids fraction, (f) repeating the above steps while switching the gas streams between each of the adsorbent beds until each adsorbent bed has performed an adsorbing, cooling, and regenerating function, and (g) recovering the hydrocarbon liquids fractions.

2. The process of recovering hydrocarbon liquids from a natural gas stream in a solid adsorbent hydrocarbon recovery unit using a plurality of beds of adsorbent performing adsorbing, cooling, and regenerating functions with closed-cycle regeneration, comprising the steps of:

(a) flowing the natural gas stream through a first adsorbent bed to remove adsorbable hydrocarbons and then discharging the stripped main gas stream from such bed, (b) flowing a portion of the stripped main gas stream from the first bed through a previously regenerated second adsorbent bed for cooling the second adsorbent bed to suitable adsorbing temperatures and then discharging this portion of the stripped main gas stream, (c) circulating a heated rich regeneration gas through a closed-cycle regeneration system including a third adsorbent bed, and separating the hydrocarbons desorbed from such bed which are carried in the regeneration gas into a rich regeneration gas and a hydrocarbon liquids fraction, (d) venting rich regeneration gas from the closed-cycle regeneration system to maintain a relatively constant rich regeneration gas inventory in the mentioned closed-cycle regeneration system, (e) combining at least the first portion of the stripped main gas stream discharged from the second adsorbent bed with vented rich regeneration gas from the closed-cycle regeneration system, (f) separating the combined gas stream into a second stripped gas stream similar to the stripped main gas stream discharged from the first adsorbent bed and a second hydrocarbon liquids fraction similar to the hydrocarbon liquids fraction produced in the closed-cycle regeneration system, (g) repeating the above steps while switching the gas streams between each of the adsorbent beds until each adsorbent bed has performed an adsorbing, cooling, and regenerating function, and (h) recovering the hydrocarbon liquids fractions.

3. The method of claim 2 wherein the rich regeneration gas downstream of the separation of the hydrocarbon liquids fraction is indirectly heat exchanged with the stripped main gas stream discharge from the second adsorbent bed.

4. The method of claim 2 wherein the second stripped gas stream is indirectly heat exchanged with the natural gas stream upstream of the first adsorbent bed.

5. The process of recovering hydrocarbon liquids from a natural gas stream in a solid adsorbent hydrocarbon recovery unit using a plurality of beds of adsorbent performing adsorbing, cooling, and regenerating functions with closed-cycle regeneration, comprising the steps of:

(a) flowing the natural gas stream through a first adsorbent bed to remove adsorbable hydrocarbons and then discharging the stripped main gas stream from such bed, (b) flowing a portion of the stripped main gas stream from the first bed through a previously regenerated second adsorbent bed for cooling the second adsorbent bed to suitable adsorbing temperatures and then discharging this portion of the stripped main gas stream, (c) circulating a heated rich regeneration gas through a closed-cycle regeneration system including a third adsorbent bed, a separator downstream of said bed, and a heater upstream of said bed; and separating in the separator the desorbed hydrocarbons from such bed which are carried in the regeneration gas into a rich regeneration gas and a hydrocarbon liquids fraction, (d) passing the rich regeneration gas upstream of the heater in indirect heat-exchanging relationship with the stripped main gas stream discharged from the second adsorbent bed, (e) venting rich regeneration gas upstream of the heater from the closed-cycle regeneration system, and introducing a portion of the natural gas stream into the closed-cycle regeneration system to maintain a relatively constant regeneration gas inventory in the mentioned closed-cycle regeneration system, (f) combining at least a portion of the stripped main gas stream discharged from the second adsorbent bed with surplus rich regeneration gas from the closed-cycle regeneration system, (g) separating the combined gas stream into a second stripped main gas stream and a second hydrocarbon liquids fraction, (h) passing the second stripped main gas stream in indirect heat-exchanging relationship with the natural gas stream upstream of the first adsorbent bed, (i) repeating the above steps while switching the fluid flows between each of the adsorbent beds at a suitable increment until each adsorbent bed has performed an adsorbing, cooling, and regenerating function, and (j) recovering the hydrocarbon liquids fractions.

6. The process of claim 5 wherein the combined stream is cooled prior to being separated into a second stripped main gas stream and a second hydrocarbon liquids fraction.

7. The process of recovering hydrocarbon liquids from a natural gas stream in a solid adsorbent hydrocarbon recovery unit using a plurality of beds of adsorbent performing adsorbing, cooling, and regenerating functions with closed-cycle regeneration, comprising the steps of:

(a) flowing the natural gas stream through a first adsorbent bed to remove adsorbable hydrocarbons and then discharging the stripped main gas stream from such bed, (b) flowing a portion of the stripped main gas stream from the first bed through a previously regenerated second adsorbent bed for cooling the second adsorbent bed to suitable adsorbing temperatures and then discharging this portion of the stripped main gas stream, (c) circulating a heated rich regeneration gas through a closed-cycle regeneration system including a third adsorbent bed, and separating the desorbed hydrocarbons from such bed which are carried in the regeneration gas into a rich regeneration gas and a hydrocarbon liquids fraction, (d) combining at least a portion of the stripped main gas stream discharged from the second adsorbent bed with the surplus to a relatively constant inventory of rich regeneration gas in the closed-cycle regeneration system, (e) separating the combined gas stream into a second stripped main gas stream and a second hydrocarbon liquids fraction, and (f) recovering the hydrocarbon liquids fractions.

8. In the process of recovering hydrocarbon liquids from a natural gas stream wherein the natural gas stream is alternately passed through each of three adsorbent beds to remove adsorbable hydrocarbons and thereafter is discharged from each such bed as a stripped main gas stream, circulating a heated regeneration gas through a closed-cycle regeneration system which includes each of said adsorbent beds which had received the natural gas stream for desorbing hydrocarbons from such bed and separating these hydrocarbons into a regeneration gas and a hydrocarbon liquids fraction, and flowing a portion of the stripped main gas stream through each of said regenerated adsorbent beds not then receiving the natural gas stream for cooling said adsorbent bed to a suitable adsorbing temperatures and then discharging this portion of the stripped main gas stream, the improvement comprising the steps of:

(a) venting the surplus rich regeneration gas from a relatively constant inventory of regeneration gas in the closed-cycle regeneration system, (b) separating the stream of surplus rich regeneration gas into a second stripped gas stream and a second hydrocarbon liquids fraction, and (c) recovering each hydrocarbon liquids fraction.

9. In the process of recovering hydrocarbon liquids from a natural gas stream wherein the natural gas stream is alternately passed through each of three adsorbent beds to remove adsorbable hydrocarbons and thereafter is discharged from each such bed as a stripped main gas stream, circulating a heated regeneration gas through a closed-cycle regeneration system which includes each of said adsorbent beds which had received the natural gas stream for desorbing hydrocarbons from such bed and separating these hydrocarbons into a regeneration gas and a hydrocarbon liquids fraction, and flowing a portion of the stripped main gas stream through each of said regenerated adsorbent beds not then receiving the natural gas stream for cooling said adsorbent bed to suitable adsorbing temperatures and then discharging this portion of the stripped main gas stream, the improvement comprising the steps of:

(a) combining at least a portion of the stripped main gas stream used to cool said adsorbent beds with surplus rich regeneration gas from a relatively constant inventory of regeneration gas in the closed-cycle regeneration system, (b) separating the combined gas stream into a second stripped gas stream and a second hydrocarbon liquids fraction, and (c) recovering each hydrocarbon liquids fraction.

10. In the process of recovering hydrocarbon liquids from a natural gas stream wherein the natural gas stream is alternately passed through each of three adsorbent beds to remove adsorbable hydrocarbons and thereafter is discharged from each such bed as a stripped main gas stream, circulating a heated regeneration gas through a closed-cycle regeneration system which includes each of said adsorbent beds which had received the natural gas stream for desorbing hydrocarbons from such bed and separating these hydrocarbons into a regeneration gas and a hydrocarbon liquids fraction, and flowing a portion of the stripped main gas stream through each of said regenerated adsorbent beds not then receiving the natural gas stream for cooling said adsorbent bed to suitable adsorbing temperatures and then discharging this portion of the stripped main gas stream, the improvement comprising the steps of:

(a) passing the stripped main gas stream used to cool said adsorbent beds in indirect heat-exchanging relationship with the rich regeneration gas, (b) combining at least a portion of the stripped main gas stream used to cool said adsorbent beds with surplus rich regeneration gas from a relatively constant inventory of regeneration gas in the closed-cycle regeneration system, (c) separating the combined gas stream into a second stripped gas stream and a second hydrocarbon liquids fraction, (d) passing the second stripped gas stream in indirect heat-exchanging relationship with the natural gas stream prior to its introduction into the adsorbent bed used for adsorbing hydrocarbons from said natural gas stream, and (e) recovering each hydrocarbon liquids fraction.

References Cited by the Examiner
UNITED STATES PATENTS

| | | | |
|---|---|---|---|
| 2,938,864 | 5/1960 | Fleck et al. | 208—310 |
| 2,982,721 | 5/1961 | Dow | 208—310 |
| 3,086,065 | 4/1963 | Dillman et al. | 208—310 |

ALPHONSO D. SULLIVAN, *Primary Examiner.*